March 24, 1964 K. L. DE PENTI ETAL 3,125,965
CONTAINER-TO-CARRIER FASTENING SYSTEM
Filed May 4, 1959 3 Sheets-Sheet 1

INVENTORS
KENNETH L. DE PENTI
DAVID J. WYROUGH
EDWARD KOZAK
BY Henry Kozak
ATTORNEY March 24, 1964     K. L. DE PENTI ETAL     3,125,965
CONTAINER-TO-CARRIER FASTENING SYSTEM
Filed May 4, 1959     3 Sheets-Sheet 2

INVENTORS
KENNETH L. DE PENTI
DAVID J. WYROUGH
EDWARD KOZAK
BY Henry Kozak
ATTORNEY March 24, 1964   K. L. DE PENTI ETAL   3,125,965
CONTAINER-TO-CARRIER FASTENING SYSTEM Filed May 4, 1959   3 Sheets-Sheet 3

INVENTORS
KENNETH L. DE PENTI
DAVID J. WYROUGH
EDWARD KOZAK
BY Henry Kozak
ATTORNEY United States Patent Office 3,125,965
Patented Mar. 24, 1964

3,125,965
CONTAINER-TO-CARRIER FASTENING SYSTEM
Kenneth L. De Penti, Mayfield Heights, Edward Kozak, Cleveland, and David J. Wyrough, Maple Heights, Ohio, assignors to National Castings Company, a corporation of Ohio
Filed May 4, 1959, Ser. No. 810,894
10 Claims. (Cl. 105—366)

The present invention relates to a system for securing an article, such as a freight container, to a laterally-open upwardly-facing under support. The invention is of particular interest in respect to current efforts within the transportation industries to devise a universally acceptable equipment system based upon a standard freight container. It is desired that such container be adapted to be carried by open-top or flat-bed railway cars or highway trucks, within boats or on the top deck surfaces thereof, or by airplanes. Further considerations in developing such a system are the fastening together of vertically adjacent containers in a stack and devising special equipment enabling the rapid transfer of the standard containers from one carrying medium or shipping platform to another.

If such standardization can be obtained, it will be possible for a shipper to place his shipment in one or more containers, send the shipment to a consignee over a route which may require movement of the shipment by a series of carriers, e.g., highway truck, ship, or railway car without any handling other than the transfer of the containers from shipping platform to carrier and vice versa, and from carrier to carrier. In such standardization there is the prospect of effecting substantial savings through reduction in the labor of freight handling and through reduction of damage to lading arising from careless handling and from transit conditions.

Hence, it is a primary object of the invention to provide a dependable structural arrangement for securing an article, such as a freight container, to the upwardly facing surface of an undersupport, and capable of maintaining substantially fixed relation between the article and the support in spite of movements of the support tending to unseat the article.

A further object is to provide said arrangement of the foregoing object in a form permitting rapid or instantaneous release, and attachment of the container or article relative to the undersupport.

Another object is to provide said arrangement without any structure of the article projecting from its undersurface.

Still another object is to provide said arrangement without any fixed structure projecting from the undersurface of the article and from the area of the undersupport covered by said undersurface when the undersupport is secured to the article.

A still further object is to provide connectors for use in said arrangement that are detachable with respect to the article and also the undersupport.

As another object, it is desired to provide said arrangement in a form having freedom from accidental uncoupling.

For achieving a stable stack of freight containers, an additional object is to provide said arrangement in a form whereby adjacent top and bottom portions of the containers are interconnected through vertically aligned elements of the arrangement.

In furtherance of the above objects, the invention provides a system for fastening a freight container or other article to the upwardly facing surface of an undersupport, such as a railway flat car bed, in which the container comprises a member, such as a structural element, fixedly included in the container structure and located adjacent an undersurface of the container; an anchor member secured to the support and projecting above the surface and, at the normal position of the container on said support, projecting into adjacent vertically overlapping relation with the container member; and a key comprising a shaft and a lug mounted eccentrically on the shaft. The container member and the anchor member each have openings in common substantially horizontal alignment at the above mentioned position which form a horizontal passageway comprising, in an approximate manner, a central bore for accommodating the shaft, and a region in contiguous eccentric relation with the bore. Such eccentric region extends both circuitously and lengthwise of the bore as a guideway for the lug in movements of the key lengthwise of the passageway between a position wherein the shaft extends into and interlocks both members, and a releasing position in which the key is entirely withdrawn from one member.

Considering the preferred embodiments of the invention, herein described, particularly with reference to the relationship of the anchor member and the container member in each instance wherein the container and the undersupport are secured together, the members in one case occur in lateral juxtaposed relation with the key extending through both members; and in the other case, the container member has a recess into which is received the anchor member whereby openings of both members are disposed in horizontal registry with the key positioned therein.

In the drawing with respect to which the invention is described in detail:

Embodiment of FIGS. 1 to 5

Figure 1:
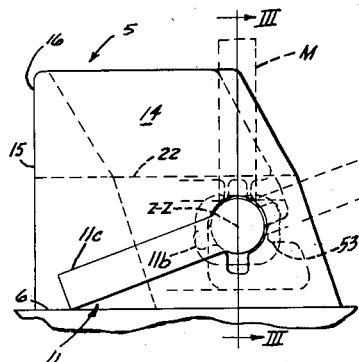
FIG. 1 is a side elevation on an anchor member adapted for receiving a cooperating lower corner member of a container in lateral juxtaposition therewith.
Figure 2:
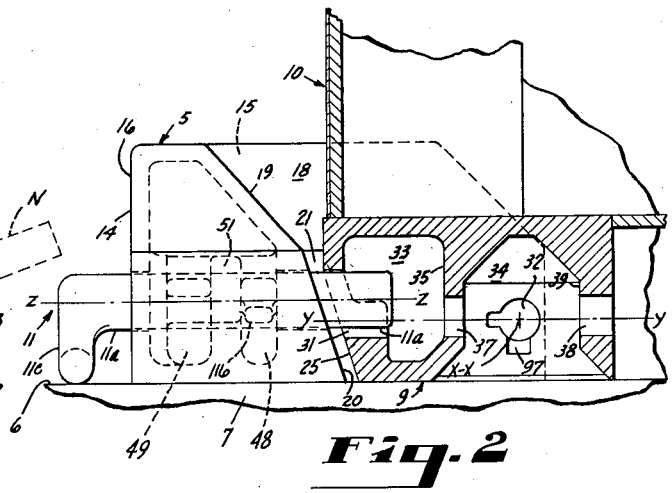
FIG. 2 is an elevation providing an end view of the anchor member of FIG. 1 and a fragmentary section of a lower corner member of the container taken along the axis of a key-receiving opening.

Considering now the first described embodiment of the invention as illustrated in FIGS. 1 to 5 of the drawing, an anchor member 5 secured, as by welding, to the upward facing surface 6 of a support 7 is shown interlocked in FIGS. 1 and 2 with a corner member 9 of a container quadrilateral 10 by a key 11.

Figure 7:
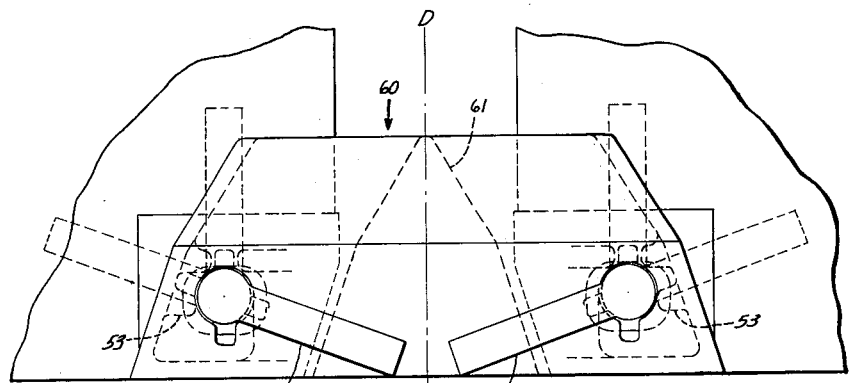
FIG. 7 is a lateral elevation of a modified anchor member adapted for receiving corner portions of two containers.
Figure 9:
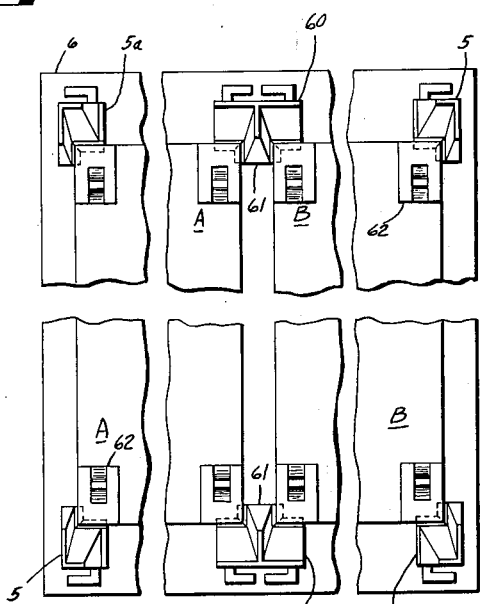
FIG. 9 is a longitudinally and laterally shortened plan view of a support and a plurality of containers secured thereto in accordance with the invention.

The anchor member 5 is L-shaped in its horizontal direciton, as indicated by observing it in plan in FIG. 9. The outer lateral surfaces 14 and 15 may be vertical and meet in a right-angle corner 16, as shown. The inner side of the anchor member 5 is formed of upper gathering surfaces 18 and 19 meeting in a dihedral angle and meeting also with a lower set of more steeply inclined surfaces 20 and 21 along a horizontal plane at 22. The gathering surfaces 18 and 19 are termed such because a plurality of anchor members are secured upon the support surface 6 to receive the container 10 upon the surface 6 with the corner member 9 in close clearance with the surfaces 21 and 20. As the container, in being lowered into proximity with the anchor members, may be out of proper vertical alignment, the corner portions of the container may first engage surfaces 18 and 19 of a plurality of anchor members, as shown in FIG. 9, and be thereby guided into a seating relation with the surface 6 within the lateral confinement provided by surfaces 20 and 21. As indicated in FIGS. 2 and 7, the surfaces 20 and 21, or surfaces analogous thereto of other anchor members, are complementary in inclination to the outer lateral faces 25 and 26 (see FIG. 13) of the container corner member 9.

The lateral sides of the corner members of the container are indented inwardly because of their inclination from the planes of adjacent vertical sides of the container. For example, in FIG. 4 the plane of the surface 26 of member 9 is in canted relation with the plane of the lateral surface 28 of the container thereby causing the surface 26 to be indented with respect to the surface 28. In view of the relative indentation of both outer surfaces of the corner member 9 with respect to adjacent vertical lateral surfaces of the container, surfaces 20 and 21 of the anchor member are slightly shorter than respectively opposed cooperating surfaces 25 and 26 of the corner member. This arrangement avoids interference of the anchor surfaces 20 and 21 with vertical side surfaces of the container adjacent the corner member 9. The inclination of these surfaces may be that of the order shown, i.e., around 15 degrees from the vertical.

An important aspect of this invention is the adaptability of the containers in accordance therewith to marine shipping. The inclination of the lower corner member surfaces 25 and 26 inwardly and downwardly facilitates the entry of the container 10 into the guide structure of a ship. Such guide structure normally comprises four vertically elongate guides of angle-shape in horizontal cross-section which are spaced horizontally to receive the corners of the container. The total horizontal clearance in any direction between the guides and the container is in the order of an inch or so. In addition to this clearance, the inwardly inclined corner surfaces of the members 9 provide an additional gathering range of perhaps an inch or so, thereby allowing a craneman a total of approximately 2 inches horizontal leeway in positioning a container for entry and descent into the hold of a ship. Furthermore, it is desirable for best guiding action that the horizontal flange widths of the angular guide members (not shown) of a ship do not exceed the horizontal dimensions of the surfaces 25 and 26. Such a container ship arrangement is deemed to be a practical one, not calling for excessive skill on the part of a craneman.

Figure 13:
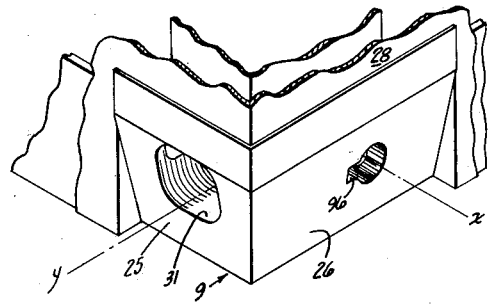
FIG. 13 is a fragmentary perspective view of the corner portion of the container showing both outside faces of the corner key-receiving member of the container.

As shown in FIG. 13, the corner member 9 has an opening 31 in its shorter face 25, and an opening 32 in the longer face 26. Each of these openings encircles one of two horizontal axes X—X and Y—Y which intersect at substantially right-angles within the member 9. These openings and the other chambers and openings found interiorly of the member adapted to receive keys of the three different types of anchor members described herein which may be used with the single type of corner member described.

Observing FIG. 2, the outer and interior walls of the container corner member 9 are arranged to define a chamber 33 and a recess 34 separated by the interior wall 35. The corner member 9 is also constructed with respect to another axis Z—Z which extends horizontally through the opening 31 in superposed parallel relation with the axis Y—Y. As shown, axes Z—Z and Y—Y are horizontally centered in the opening 31; neither axis is in vertically centered position in this opening. The opening 31 is of general rectangular outline with its longer dimension being horizontal. The location of axis Z—Z is that followed by the axis of the shaft portion 11a of the key 11 in movements into and out of the member 9. The height of the opening 31 above the axis Z—Z is at least equal to the radius of the shaft portion 11a in order to allow free passage of the shaft into the chamber 33.

That portion of the height of the opening 31 below the axis Y—Y is at least equal to the radius of openings 37 in the wall 35 and opening 38 through an inner peripheral wall 39 of the member 9. Openings 37, 38 are coaxial with respect to axis Y—Y and define a bore extending through the member 9 for receiving the shaft portion of a locking key of another embodiment herein later described.

Figure 3:
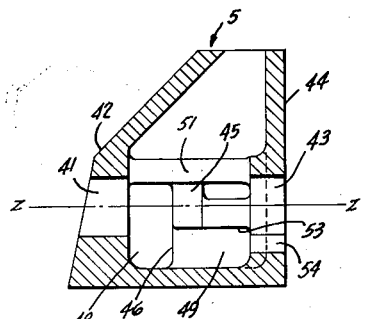
FIG. 3 is a sectional view taken along lines 3—3 of FIG. 1.
Figure 4:
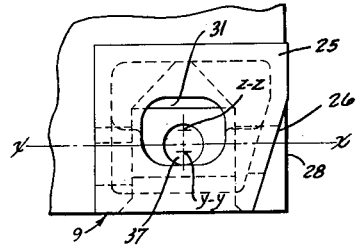
FIG. 4 is a fragmentary elevation of the corner portion of the container shown in FIG. 2 as viewed when looking directly at the shorter lateral face of the lower corner key-receiving member of the container.
Figure 5:
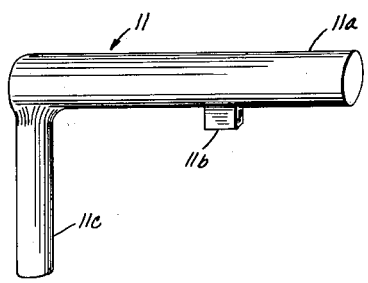
FIG. 5 is a perspective view of the key shown in FIGS. 1 and 2.
Figure 6:
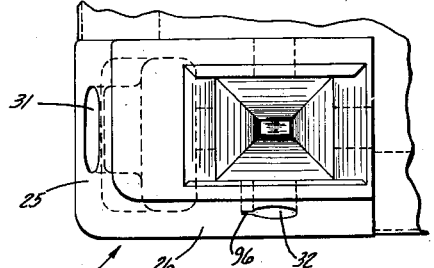
FIG. 6 is a bottom view of the corner portion of a container including the corner member shown in FIGS. 2 and 4.

In the embodiment illustrated by FIGS. 1 to 3, the anchor member 5 has a bore formed by openings 41 in the inboard peripheral wall 42 of the member, opening 43 through the outboard peripheral wall 44, and opening 45 through the intermediate wall 46 of the member 5. Openings 41, 43, and 45 are coaxial with respect to axis Z—Z to provide a bore extending from the outboard side of the member to its inboard side in which to support the shaft portion 11a of the key 11.

The key has a lug 11b rigidly attached to the shaft portion 11a in eccentric relation therewith. As shown, this lug projects away from the shaft portion in a direction parallel to the handle portion 11c of the key. The lug 11b cooperates with internal structure of the member 5 defining two chambers 48 and 49 which form eccentric regions of the general passageway for the key within the member. The internal wall structure of the anchor member 5 further defines an opening or passageway 51 in the wall 46 that is contiguous with both chambers 48 and 49 and large enough for passage of the lug 11b from one chamber to the other as the lever 11 is shifted between respective positions for locking and unlocking a container relative to the support 7.

As shown, the position in which the key 11 locks the container 10 to the surface 6 is obtained when the key is in its position furthest to the right as viewed in FIG. 2, with the lug 11b occupying the chamber 48 and the end of the handle portion 11c resting against the surface 6. To disengage the key 11 from the container 10 and place it in unlocking position, the key is rotated clockwise as viewed in FIG. 1 until the handle points straight upwardly in the position M, shown in ghost outline. With the handle thus aligned, the key may be slid toward the left through the passageway 51 into the chamber 49. Thereupon, the key is further rotated clockwise until its handle portion assumes the position N (in dotted outline) wherein the lug 11b rests on a stop formed in the chamber 49 by a bridge 53 extending radially inwardly from the outer periphery of the chamber 49.

The outboard wall 44 has a slot 54 forming a downward extension of the opening 43 directly under the axis Z—Z. This slot is large enough for passage of the lug 11b therethrough and permits complete removal of the key 11 from the member 5. However, this member must be in a condition permitting counterclockwise rotation of the key from its locking position illustrated in full line to a position wherein the handle points directly downward. In the embodiment shown, this condition is obtained only when the member 5 is removed from the support 6. It is apparent, of course, that passageways for movement of the lug through the member 5 lengthwise of the axis Z—Z may be arranged in angular relation with the axis Y—Y to obtain any desired angular relationships in the locking, unlocking, and withdrawal positions of the key.

FIG. 9 illustrates in plan view the manner in which a pair of anchor member 5 are utilized to secure containers A and B to the support 6. This figure also brings out the fact that it may be necessary to construct other anchor members 5a ("lefts") which are similar in construction but are mirror images of the anchor members 5 ("rights"). FIG. 9 incorporates also a further embodiment of the invention, i.e., anchor members, such as member 60, which are secured to the support in such relation to member 5 and 5a as to receive adjacent intermediate corners of two adjacent containers supported on a multiple container support.

Figure 8:
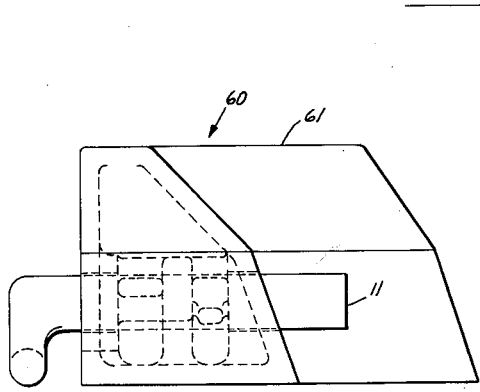
FIG. 8 is an end elevation of the anchor member shown in FIG. 7.

The Embodiment of FIGS. 7 and 8

In FIG. 7, the portion of the anchor member 60 to the right of plane D—D may be regarded as being exactly similar in structure to member 5 of FIGS. 1, 2, and 3. The portion of member 60 to the left of plane D—D is a mirror image of the right portion. The keys 11 of FIG. 7 may be identical in construction. The plan view, FIG. 9, makes it obvious that each anchor member 60 has a T-shaped outline of which the stem portion 61 of the T extends, during use, between adjacent containers.

Figure 10:
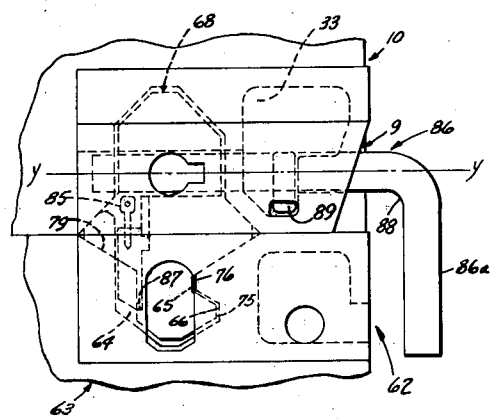
FIG. 10 is a fragmentary lateral elevation of a modified embodiment illustrating portions of a support and a container secured together by a detachable connector.
Figure 11:
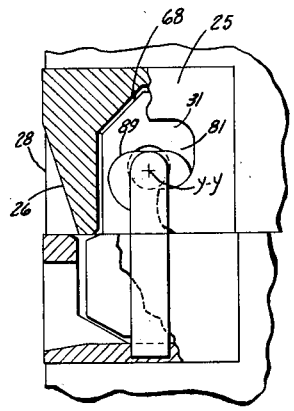
FIG. 11 is a fragmentary end view of the structure illustrated in FIG. 10 with face wall portions partially broken away.
Figure 12:
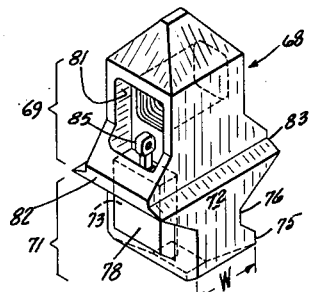
FIG. 12 is a perspective view of the detachable connector shown in FIGS. 10 and 11.

The Embodiment of FIGS. 10, 11 and 12

FIGS. 10, 11, and 12 illustrate the third embodiment of the invention in which the container 10 may be secured to a member 62 forming a portion of, or fixedly associated with, a support 63. The support 63 may occur in the form of the upper corner portion of a container identical to container 10 or as a portion of a truck bed, railroad flat car, or other carrier platform. The interior wall surfaces of the member 62 define a recess 64 in which a tongue or ledge 65 protrudes horizontaly from the vertical plane of a side surface in the groove 66, partly forming the recess 64, to form a lower pocket portion of the recess overhung by the tongue 65.

The recess 64 and the recess 34 are similar in the respect that each has a flared gathering periphery tapering inwardly of the recess from its open end to effect gathering action with respect to a connector 68 having upper and lower "halves" or sections separately insertable into corresponding recesses of the members 9 and 62. Each "half" of the connector comprises an intermediate portion of vertical side walls cooperating with vertical walls of the corresponding recess in which it is received to resist any camming action between the connector 68 and either member 9 or 62, and a frustopyramidal end portion adapted for generally complementary relation with the frustopyramidal end surface of such corresponding recess.

As illustrated, the connector and the recesses are generally quadrilateral in any horizontal cross-section. That is to say, the upper half 69 of the connector 68 is generally complementary to the recess 34. The lower half or section 71 is complementary to the recess 64 along opposite side surfaces 72 and 73 thereof, and on a third side, has a tongue 75 and a groove 76 generally complementary to the tongue 65 and the groove 66 of the recess 64. The lower portion 71, however, is sufficiently narrow, as measured along width W (see FIG. 12), to permit lateral movement of the connector within the recess 64 toward the left as viewed in FIG. 10, when a lock 78 is withdrawn or positioned above a gathering surface 79 and to permit movement of the tongues 65 and 75 out of vertical interference or alignment. In the event of such lateral displacement of the connector 68 within the recess 64, the connector may be readily raised upwardly out of the recess.

The lock 78 is supported within a slot 81 which extends longitudinally and vertically within one side of the connector, including both the top and bottom halves 69, 71 and extending past and over an adjacent end of a transverse key-receiving opening in the top half or section 69. The lock is retained in the slot by a bridge 82 formed by a protruding belt portion 83 extending entirely around the connector 68 at its center elevation. The lock has a small handle 85 screwed into, or otherwise fastened to, the upper surface of the lock. The height of the handle is limited, as shown in FIG. 10, to a height which fixes its upper extremity below and out of horizontal interference with a key 86 positioned in a horizontal passageway provided by key-receiving openings within the member 9 and the connector 68 in horizontal alignment.

When the key 86 is positioned as shown in FIG. 10, the lock 73 is positively confined in the lower portion of the slot 81. In the lower position of the lock 78, the lower end of the lock engages a shelf 87 forming the lower extremity of the slot 81. With the lock resting on this shelf, the handle 85 extends upwardly into close clearance with the periphery of the shaft portion of the lever 86. Hence, the lock 78 is confined as to vertical movement, and its lower end surface remains substantially below the inclined gathering surface 79, thereby preventing any withdrawal of the connector 68 from the recess 64 with the key 86 in locking position.

The key 86 may comprise, as shown, a central rod of circular cross-section bent at 88 to form a handle portion 86a and a shaft portion 86b, and a lug 89. The lug is fixed to the shaft portion at a point whereat the shaft portion may be supported entirely within the passageway formed by the horizontally aligned openings of the member 9 and the upper portion 69 of the connector 68, and the lug positioned in the chamber 33. The lug 89 is contoured with respect to the opening 31 to require rotation of the key 180 degrees from the position shown to the position wherein the handle extends perpendicularly upward from the axis Y—Y in order for the lug to be passed through the opening 31. This result will be evident in observing in FIG. 4 that the extreme lower points in the peripheries of the openings 37, 38, and 31 are at the same level; that the upper flat surface of the lug 89 is tangent with the periphery of the shaft portion 86b; that the horizontal length of the lug 89 as viewed in FIG. 11 is approximately equal to that of the opening 31; and that the vertical width of the lug is almost equal to that of the opening 31. When the key 86 is removed from the assembly shown in FIG. 10, it is obvious that the lock 78 of the connector 68 may move upwardly sufficiently to place its lower end surface above the end surface 79. The connector may thereupon be displaced laterally and upwardly to move the tongues 65 and 75 out of vertical interference and completely withdrawn from the recess 64.

Figure 14:
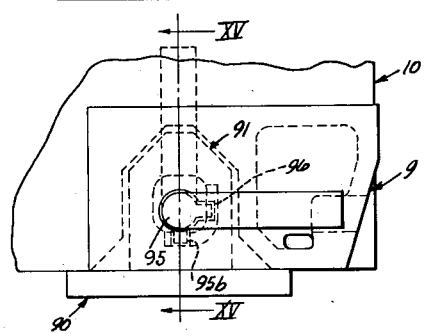
FIG. 14 is a fragmentary lateral elevation of a corner portion of a container comprising a corner member, such as shown in previous figures, in cooperative relation with a modified anchor member.
Figure 15:
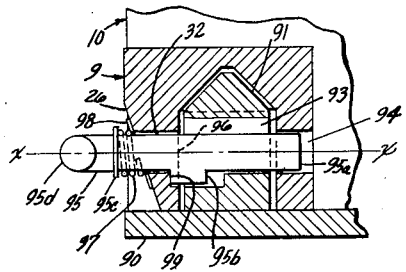
FIG. 15 is a vertical section taken along line XV—XV of FIG. 14.

Embodiment of FIGS. 14 and 15

The embodiment finally illustrated by the drawing is that shown in FIGS. 14 and 15. In this arrangement, a support 90 and an anchor member 91 affixed thereto receive the corner portion of a container 10 with the anchor member 91 extending upwardly into the recess 34 of the container corner member 9, in much the same manner as the upper half 69 of connector 68 of the previously described embodiment projects into the recess 34. The anchor member 91 is similar to the upper half 69 of the connector 68 and generally complementary in contour with the recess 34. As shown, the bore or opening 93 of the anchor member 91 is aligned for registry with the openings 32 and 94 in coaxial relation with the axis X—X. This axis is at right-angles with axis Y—Y of the opening occupied by the key 86 of the prior described embodiment.

A key 95 constructed to extend through openings 32, 93, and 94 as shown in FIG. 15 comprises a shaft portion 95a, a lug 95b, a flange 95c, and a handle portion 95d. The opening 32 comprises a slot 96 through which the lug 95 passes when inserting the key 95 into the passageway comprising the openings 32, 93, and 94. The opening 93 of the anchor member is oversize to provide room for the lug 95b permitting complete rotation of the key and the lug within this opening. The opening 32 of the container member 9, in addition to slot 96, comprises a recess 97 along its lower periphery and along the inward surface of an outer wall of the member 9 defining the recess 34. Recess 96 functions as a notch for receiving an outboard end portion of the lug 95 and trapping it in a position holding the key in its member-locking position. Securing of the key 95 in this position is further promoted by the pressure of the spring 97 under compression between the flange 95c and a washer 98 bearing against the other wall surface 26 of the member 9.

Removal of the key 95 from the assembly shown in FIGS. 14 and 15 is effected by pushing the key to the right (see FIG. 15) against the pressure of the spring 97 until the lug 95b is displaced from the recess 96, and rotating the key counterclockwise to the upward position of the handle shown in ghost outline in FIG. 14. At this position, the key may be easily pulled to the left (FIG. 15) with the lug 95b passing through the slot 96. Upon complete removal of the key 95 from the container 10, the container may be lifted from the support 90 when desired.

The foregoing describes a practical system for securing a container to a carrier or other support utilizing a single type of corner member or casting adapted for use with, e.g., the several types of member herein described for anchoring the container or other article to the support. The invention has great potential use in commercial freight handling operations based on a standard type of freight container adapted for transportation by all types of carriers.

The terms and expressions which have been employed are used as terms of description and not of limitation and there is no intention of excluding such equivalents of the invention described or of the portions thereof as fall within the purview of the claims.

What is claimed is:

1. A system for fastening a container to an upwardly facing surface of a support comprising: a member of the container fixedly included in the structure thereof as a substantially square bottom corner portion having an undersurface and two side walls substantially in the planes of outer corner-forming sides of a container; said member having a cavity and a recess separated by an inner vertical wall and located horizontally inwardly in the order named from one of said outer lateral walls; the recess forming an opening in said undersurface and extending upwardly therefrom; said container member having horizontal openings extending inwardly from the exterior of both of said side walls along generally horizontal axes crossing at substantially right angles centrally within the recess; one of the axes extending centrally through both the cavity and the recess; an anchor member secured to the support and projecting thereabove, at the normal position of the container on said support, into adjacent vertically overlapping relation with the container member to dispose a horizontal opening therethrough in registry with one of said horizontal openings in the container member said opening of the anchor member and said one opening of the container member constituting a passageway along one of said axes; and key means comprising a shaft portion insertable through said openings of the members in registry to a position substantially occupying said passageway.

2. The system of claim 1 wherein: said shaft has a lug disposed on the portion of the shaft received in said container member, and each of said outer lateral walls has an opening eccentrically enlarged with respect to its respective axis for admitting the lug.

3. The system of claim 1 wherein: one of said openings of the container member is disposed in one of said side walls, along and in eccentric non-centered relation with, said axis passing through the recess and cavity; and the key has a lug traversable through said opening into the cavity at one angular position of the key relative to said axis and entrappable within the cavity behind said wall at another angular position of the key.

4. The system of claim 1 wherein: said anchor member extends into said recess, and said key is receivable by said openings in a position wherein it extends through both members.

5. The system of claim 4 wherein: the support has a recess extending downwardly from said support surface; and said anchor member has an upper section receivable in said member recess, and a lower portion receivable in said support recess; and releasable means carried by said lower portion and insertable therewith into the support recess for attaching the anchor member to the support.

6. The system of claim 4 wherein: the lower section of the anchor member and the interior walls of the support recess comprise laterally overlapping tongue and groove interlockable portions, said lower section comprises lock means for securing the anchor member within the recess against lateral movement carrying the interlockable portions out of vertical interference; and said key means, when disposed in said passageway, extending over the upper end of said locking means to confine said locking means along said lower section and within said recess 7. A quadrilateral container comprising a member fixedly included in structure thereof as a bottom substantially square corner portion having an undersurface and two lateral side walls approximately in the planes of two outer corner-forming sides of the container; said member having a cavity and a recess separated by an inner vertical wall and located horizontally inwardly in the order named from one of said outer walls; the recess forming an opening in said undersurface and extending upwardly therefrom; said member having horizontal openings extending inwardly from the exterior of both of said side walls along generally horizontal axes crossing at substantially right angles centrally within the recess; one of the axes extending centrally through both the cavity and the recess.

8. The container of claim 7 especially adapted for stacking comprising one of said members at each bottom corner; and a corner member at each top corner having a recess extending inwardly and downwardly from its top surface in vertical alignment with said recess of the corresponding subterposed lower corner member; the walls of the recess in each top corner member tapering generally downwardly with a wall along one side of the recess forming a horizontal groove and a horizontal tongue overhanging the groove.

9. A bottom corner member adapted for rigid attachment within the structure of a generally quadrilateral cargo container, the member having an undersurface and two lateral side walls adapted to extend approximately in the planes of two corner-forming sides of the container; said member having a cavity and a recess separated by an inner vertical wall and located horizontally inwardly in the order named from one of said side walls; the recess forming an opening in said undersurface and extending upwardly therefrom; said member having horizontal openings extending inwardly from both of said side walls along generally horizontal axes crossing at substantially right angles centrally within the recess; one of the axes extending through both the cavity and the recess.

10. An anchor member for use with a container and an undersupport for the container which have vertically alignable recesses, comprising: a laterally outwardly tapered flange-like belt portion; an upper section tapering upwardly from said belt portion and having a key-receiving opening extending transversely therethrough; a downwardly tapered lower section having a horizontal groove along a side thereof to provide a laterally extending tongue below the groove; on the side of the member opposite the groove, the member having a vertical slot in the lower section extending as an aperture upwardly through the belt portion, then upwardly as a slot within the upper section over an adjacent end of said key-receiving opening; said slot containing a lock supported therein for vertical reciprocation lengthwise of the slot; and stop means for the lock in the lower end of the slot; the lock, when resting against said stop means, having a length disposing its upper end closely subjacent to the nearer end of said hole to enable a key positioned therein to extend over the lock and retain it along said lower section.

References Cited in the file of this patent

UNITED STATES PATENTS

| | | |
|---|---|---|
| 1,406,294 | Smith | Feb. 14, 1922 |
| 1,408,414 | Smith | Feb. 28, 1922 |
| 1,988,942 | Fildes | Jan. 22, 1935 |
| 2,128,364 | Kellett | Aug. 30, 1938 |
| 2,457,842 | Smith et al. | Jan. 4, 1949 |
| 2,613,836 | Newhall et al. | Oct. 14, 1952 |
| 2,699,735 | Williams | Jan. 18, 1955 |
| 3,043,411 | Wyrough | July 10, 1962 |